April 3, 1962 L. W. TOBIN, JR 3,027,762
INERTIAL NAVIGATION SYSTEM FOR AIRCRAFT
Filed June 26, 1958
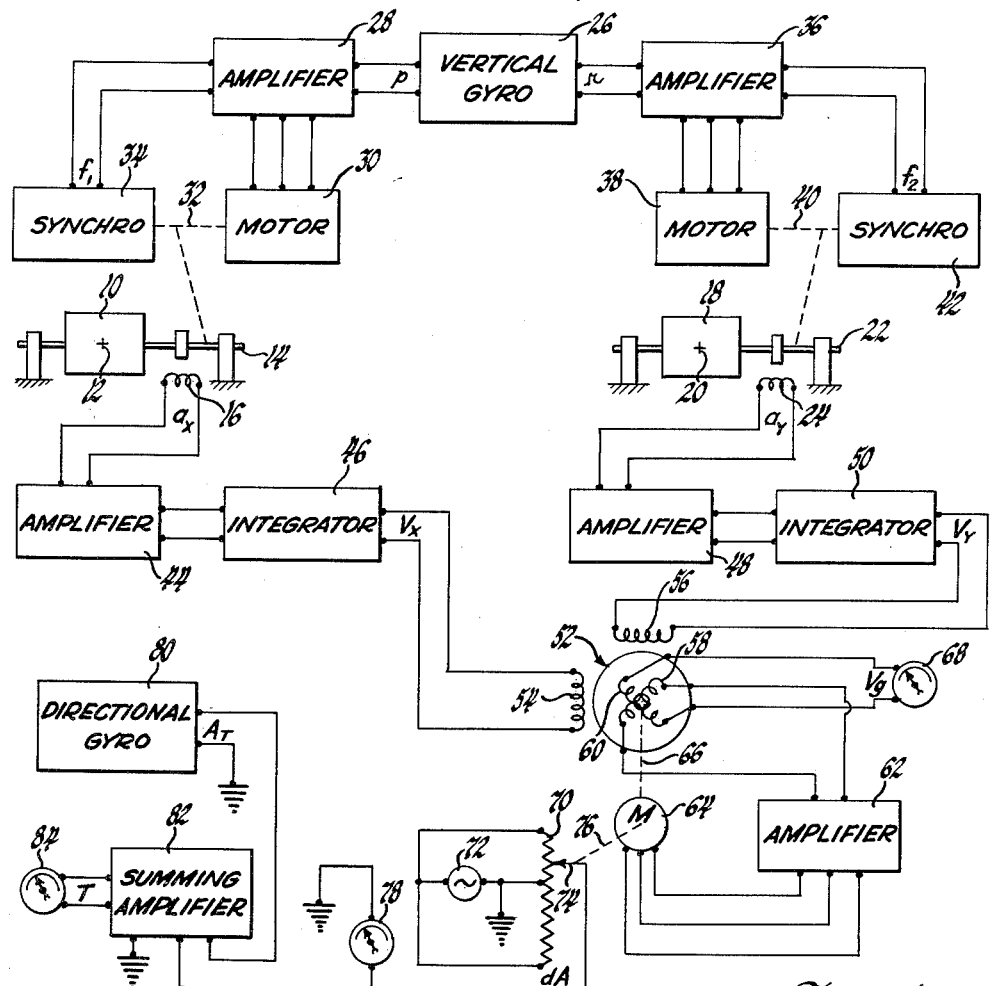
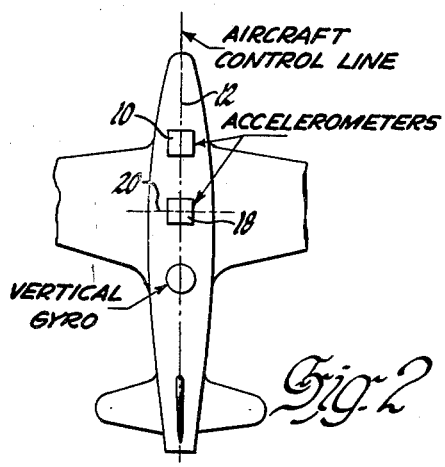
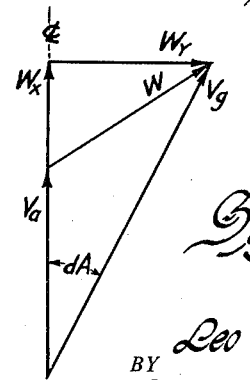
INVENTOR.
Leo W. Tobin, Jr.
BY
E. W. Christen
ATTORNEY 3,027,762
Patented Apr. 3, 1962

3,027,762
INERTIAL NAVIGATION SYSTEM FOR AIRCRAFT
Leo W. Tobin, Jr., Flint, Mich., assignor to General Motors Corporation, Detroit, Mich., a corporation of Delaware
Filed June 26, 1958, Ser. No. 744,815
3 Claims. (Cl. 73—178)

This invention relates to navigation systems and more particularly to inertial systems for use in navigation of aircraft.

In aircraft navigation, it is desired to develop, without external reference, ground speed, track and drift angle information. This is accomplished in accordance with this invention by an inertial system which obviates the need for the usual stable platform and which utilizes commercially available components of relatively low cost and light weight. The system employs a pair of accelerometers, one of which has its input axis in the plane of the aircraft control line or roll axis and the other having its input axis in a plane perpendicular to aircraft control line or parallel to the pitch axis and each accelerometer is independently stabilized in the local horizontal plane. The acceleration signal quantities are integrated with respect to time to provide signal quantities corresponding to velocity along the aircraft control line and perpendicular to the aircraft control line in the local horizontal plane. These velocity components are vectorially combined to develop signal quantities representing ground speed and drift angle of the aircraft. A true heading signal quantity, derived suitably from a directional gyro, is combined with the drift angle signal quantity to yield track angle of the aircraft.

A more complete understanding of this invention may be had from the detailed description which follows taken with the accompanying drawings in which:

FIGURE 1 is a diagrammatic representation of the inertial navigation system;

FIGURE 2 shows the orientation of the accelerometers with reference to the aircraft control line; and FIGURE 3 is a vector diagram representing a typical navigation problem.

Referring now to the drawings, there is shown an illustrative embodiment of the invention in an inertial navigation system for aircraft. The system comprises an accelerometer 10 having its input axis 12 aligned with the aircraft control line. The accelerometer is mounted on a shaft 14 which extends parallel to the aircraft pitch axis and is supported for rotation relative to the airframe in suitable journals so that the input axis 12 may be stabilized in the local horizontal plane. The accelerometer 10 is provided with a pick-off 16 for developing a signal voltage $a_x$ having an amplitude corresponding to the instantaneous value of acceleration along the input axis 12. An accelerometer 18 has its input axis 20 disposed in a plane perpendicular to the aircraft control line and is mounted for rotation relative to the airframe upon a shaft 22 which extends parallel to the aircraft control line or roll axis so that the accelerometer input axis may be stabilized in the local horizontal plane. The accelerometer 18 is provided with a pick-off 24 which develops a signal voltage $a_y$ having an amplitude corresponding to the instantaneous value of acceleration along the input axis 20. The accelerometers 12 and 18 are suitably of the constrained mass type and may take the form of the well known pendulum unit. As will appear subsequently, the accelerometers may also be of the integrating type such as a gyro accelerometer.

In order to stabilize the accelerometers in the manner previously mentioned, there is provided a vertical gyro 26 which, in the illustrative embodiment, is a self-contained unit maintaining reference to the local vertical and developing both pitch and roll information. A pitch angle signal $p$ corresponds in amplitude and phase to the extent and direction of the angular displacement of the aircraft roll axis from the local horizontal plane. The pitch angle signal is applied to the servo amplifier 28 which controls the energization of the reversible servomotor 30. The servomotor is mechanically coupled through shaft 32 to the shaft 14 of the accelerometer 10 and to the rotor of a synchro 34. The synchro develops a follow-up voltage $f_1$ corresponding to the angular displacement of its rotor from its reference position. The follow-up voltage $f_1$ and the pitch voltage $p$ are combined algebraically in a well known manner in amplifier 28 to develop an error voltage which energizes the servomotor to continuously reduce the error voltage to null and maintain the angular displacement of the shaft 32 proportional to pitch angle. Accordingly, the input axis of the accelerometer 10 is maintained in the local horizontal plane despite changes of aircraft pitch angle. In a similar manner, the roll angle signal voltage $r$ from the vertical gyro is applied to the servo amplifier 36 which energizes the servomotor 38. The servomotor has its output shaft 40 coupled to the shaft 22 of accelerometer 18 and to the rotor of a synchro 42 which develops a follow-up $f_2$. The follow-up voltage is differentially combined with the roll signal $r$ in the amplifier 36 to develop an error voltage which energizes the servomotor to continuously reduce the error voltage to null value and maintain the servomotor shaft angularly displaced in accordance with the roll angle. Accordingly, the input axis 20 of accelerometer 18 is maintained in the local horizontal plane.

With the accelerometers thus stabilized, components of aircraft acceleration in the horizontal plane are measured and corresponding velocity components are readily derived. For this purpose, the acceleration signal $a_x$, derived from accelerometer 10 and corresponding to the acceleration along the aircraft control line in the horizontal plane, is applied through the amplifier 44 to the integrator 46 to develop the velocity signal $v_x$. Similarly, the acceleration signal $a_y$, derived from the accelerometer 18 and corresponding to aircraft acceleration perpendicular to the aircraft control line in the horizontal plane is applied through amplifier 48 to the integrator 50 to develop the velocity signal $v_y$.

In order to develop ground speed, track and drift angle information from the velocity signals, a suitable computer is employed for vectorially combining the velocity signals. For this purpose, a resolver 52 has one of its stator windings 54 excited with the velocity signal $v_x$ and its quadrature stator winding 56 excited with the velocity signal $v_y$. The resolver rotor winding 58 is connected to the servo amplifier 62 which controls the energization of the reversible servomotor 64. The servomotor 64 is mechanically coupled through shaft 66 with the rotor of the resolver 52 and is energized by the amplifier 62 to angularly displace the rotor winding 58 to maintain the induced voltage in the winding 58 at null value. Thus the angular displacement of the rotor shaft corresponds to the angle whose tangent is the ratio of the amplitude of the velocity components $v_x$ and $v_y$. In this position, the quadrature rotor winding 60 develops an induced voltage having an amplitude corresponding to the vector sum of the velocity components. This voltage is applied to an instrument 68 for indicating the value of ground speed $V_g$.

To develop drift angle information, there is provided a potentiometer 70 excited from an alternating reference voltage source 72 having one terminal connected to the potentiometer center tap and the other terminal connected to both end terminals of the potentiometer. The movable contact 74 of the potentiometer is coupled by shaft 76 with the servomotor 64 and therefore develops a voltage corresponding in phase and amplitude to the angular displacement of the servomotor 64 and hence the drift angle of the aircraft. This drift angle voltage $dA$ derived from the potentiometer movable contact 74 is applied to the instrument 78 for indicating the drift angle value.

To develop track angle information, the system includes a direction sensing instrument such as the directional gyro 80 of conventional design which develops a true heading signal voltage $A_T$. The true heading voltage $A_T$ and the drift angle voltage $dA$ are algebraically combined in the summing amplifier 82 and the summation thereof is applied to an instrument 84 for displaying the value of track angle.

In considering the operation of the system just described, reference is made to the vector diagram of FIGURE 3 representing a typical navigation problem. Assume that the aircraft has a velocity relative to the air mass in the direction of its control line represented by the airspeed vector $V_a$. The velocity of the air mass relative to the earth is represented by the wind speed vector W. The wind speed vector has a component $W_x$ along the control line of the aircraft and has a component $W_y$ perpendicular to the control line of the aircraft. Consequently, the velocity of the aircraft relative to the earth along the control line is the sum of the vectors $V_a$ and $W_x$ and this summation is equal to the time integral of the acceleration signal voltage $a_x$ developed by the accelerometer 10. The time integral of the acceleration signal $a_x$ is equal to the velocity signal voltage $v_x$ applied to the resolver winding 54. The velocity of the aircraft relative to the earth in a direction perpendicular to the control line is the wind speed component $W_y$. This wind speed component $W_y$ is equal to the time integral of the acceleration voltage signal $a_y$ developed by accelerometer 18. This time integral is developed by the integrator 50 and is equal to the velocity signal voltage $v_y$ which is applied to the resolver winding 56. Accordingly, with these excitation voltages $v_y$ and $v_x$ applied to the resolver stator windings, the resolver rotor is displaced through an angle whose tangent is the ratio of $v_y$ to $v_x$ which corresponds to the drift angle $dA$. A voltage $V_g$ corresponding in amplitude to the vector sum of $v_x$ and $v_y$ is induced in the rotor winding 60 and applied to the instrument 68 for indicating ground speed. Simultaneously, the movable contact 74 of potentiometer 70 is displaced angularly with the resolver rotor and a voltage $dA$ corresponding to drift angle is applied to the instrument 78 for indicating the value of drift angle. The true heading signal voltage $A_t$ from the directional gyro 80 is algebraically combined with the drift angle voltage $dA$ in the summing amplifier 82 and is applied to the instrument 84 for indicating the value of track angle.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. An inertial navigation system for aircraft comprising a first accelerometer having its input axis in the plane of the aircraft control line, means for stabilizing the first accelerometer with its input axis in the local horizontal plane, integrating means operatively connected with and responsive to the output of the first accelerometer to develop an output signal voltage corresponding to ground velocity of the aircraft along its control line, a second accelerometer having its input axis in a plane perpendicular to the aircraft control line, means for stabilizing the second accelerometer with its input axis in the local horizontal plane, integrating means operatively connected with and responsive to the output of the second accelerometer to develop an output signal voltage corresponding to ground velocity of the aircraft perpendicular to its control line, a resolver connected with both of said integrating means and combining said signal voltages vectorially to develop a resultant voltage corresponding to ground speed, transducer means connected with said resolver for developing a signal voltage corresponding to drift angle, a direction sensing means developing an output voltage corresponding to true heading of said aircraft, and algebraic summing means connected with said direction sensing means and said transducer means for developing an output voltage corresponding to track angle.

2. An inertial navigation system for aircraft comprising a first accelerometer having its input axis in the plane of the aircraft control line, means for stabilizing the first accelerometer with its input axis in the local horizontal plane, integrating means operatively connected with and responsive to the output of the first accelerometer to develop an output signal voltage corresponding to ground velocity of the aircraft along its control line, a second accelerometer having its input axis in a plane perpendicular to the aircraft control line, means for stabilizing the second accelerometer with its input axis in the local horizontal plane, integrating means operatively connected with and responsive to the output of the second accelerometer to develep an output signal voltage corresponding to ground velocity of the aircraft perpendicular to its control line, a resolver having its input windings connected respectively with said integrating means, and servo means connected with one of the resolver output windings and displacing the resolver rotor to maintain the voltage induced therein at null value whereby the rotor angle corresponds to aircraft drift angle, and the voltage induced in the other of the resolver output windings corresponds to aircraft groundspeed, a directional gyro developing an output voltage corresponding to true heading of the aircraft, transducer means mechanically connected with said servo for developing an output voltage corresponding to drift angle, and summing means connected with the directional gyro and the transducer means for combining the output voltages thereof to develop a voltage corresponding to track angle of the aircraft.

3. An inertial navigation system for aircraft comprising a vertical gyro means developing pitch and roll angle signals, a first accelerometer mounted on the aircraft by a first rotatable support having a single rotation axis extending perpendicular to the aircraft control line, the input axis of the first accelerometer being in the plane of the aircraft control line, servo means connected between the vertical gyro means and the first rotatable support and responsive to the pitch angle signal for maintaining the input axis of the first accelerometer in the local horizontal plane, a second accelerometer mounted on the aircraft by a second rotatable support having a single rotation axis aligned with the aircraft control line, the input axis of the second accelerometer being in a plane perpendicular to the aircraft control line, servo means connected between the vertical gyro and the second rotatable support and responsive to the roll angle signal for maintaining the input axis of the second accelerometer in the local horizontal plane, and computer means including first and second integrators operatively connected respectively with the first and second accelerometers, said first and second integrators being responsive to the output of the first and second accelerometers respectively, a resolver having its input windings connected respectively with the first and second integrators, servo means connected with one of the resolver output windings and displacing the resolver rotor to maintain the voltage induced therein at null value whereby the rotor angle corresponds to aircraft drift angle and the voltage induced in the other of the resolver output windings corresponds to aircraft groundspeed, a directional gyro developing an output voltage corresponding to true heading of the aircraft, transducer means mechanically connected with the resolver rotor for developing an output voltage corresponding to drift angle, and summing means electrically connected with the directional gyro and the transducer means for combining the output voltages thereof to develop a voltage corresponding to track angle of the aircraft.

References Cited in the file of this patent

UNITED STATES PATENTS

| | | |
|---|---|---|
| 2,371,626 | Kecskemeti | Mar. 20, 1945 |
| 2,465,624 | Agins | Mar. 29, 1949 |
| 2,532,158 | Ewing | Nov. 28, 1950 |
| 2,613,071 | Hansel | Oct. 7, 1952 |
| 2,734,278 | Hammond | Feb. 14, 1956 |
| 2,796,594 | Chombard | June 18, 1957 |

FOREIGN PATENTS

| | | |
|---|---|---|
| 746,732 | Great Britain | Mar. 21, 1956 |